(12) United States Patent
Boulter et al.

(10) Patent No.: US 9,112,768 B1
(45) Date of Patent: Aug. 18, 2015

(54) DISCOVERING NON MANAGED DEVICES IN A NETWORK SUCH AS A LAN USING HTTP

(75) Inventors: Brendan Boulter, Galway (IE); Christopher Robert Linzell, St Albans (GB); Simon Peter Valentine, Hemel Hempstead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2163 days.

(21) Appl. No.: 09/662,534

(22) Filed: Sep. 15, 2000

(30) Foreign Application Priority Data

Apr. 7, 2000 (GB) .................................. 0008673.6

(51) Int. Cl.
  *G06F 15/173* (2006.01)
  *H04L 12/24* (2006.01)
  *H04L 29/06* (2006.01)
(52) U.S. Cl.
  CPC ............ *H04L 41/0213* (2013.01); *H04L 29/06* (2013.01)
(58) Field of Classification Search
  USPC ......... 709/223, 224, 203, 204, 226, 221, 220, 709/228; 713/168, 201, 226
  See application file for complete search history.

(56) References Cited

U.S. PATENT DOCUMENTS

| | | | |
|---|---|---|---|
| 5,742,762 A | 4/1998 | Scholl et al. | |
| 5,805,442 A | 9/1998 | Crater | |
| 5,975,737 A | 11/1999 | Crater | |
| 5,982,362 A | 11/1999 | Crater | |
| 5,987,513 A * | 11/1999 | Prithviraj et al. | 709/223 |
| 6,061,603 A | 5/2000 | Papadopoulos | |
| 6,067,558 A * | 5/2000 | Wendt et al. | 709/202 |
| 6,151,625 A | 11/2000 | Swales | |
| 6,249,814 B1 * | 6/2001 | Shaffer et al. | 709/223 |
| 6,282,454 B1 | 8/2001 | Papadopoulos | |
| 6,308,205 B1 * | 10/2001 | Carcerano et al. | 709/221 |
| 6,411,997 B1 * | 6/2002 | Dawes et al. | 709/224 |
| 6,484,061 B2 | 11/2002 | Papadopoulos | |
| 6,490,617 B1 * | 12/2002 | Hemphill et al. | 709/223 |
| 6,587,884 B1 | 7/2003 | Papadopoulos | |
| 6,640,140 B1 | 10/2003 | Lindner | |

(Continued)

FOREIGN PATENT DOCUMENTS

WO   WO 00/03550   1/2000

*Primary Examiner* — Kyung H Shin
(74) *Attorney, Agent, or Firm* — Michaelson & Wallace

(57) ABSTRACT

The topology of a computer network may be by the process of discovery in which each of the devices of the network is interrogated to thereby produce details of the network and its operation, preferably in the form of a network map which may be displayed on a visual display unit showing the devices and links between the devices. At its simplest, and where the device is a "managed" device, this information is usually provided by interrogation using a known protocol, such as the SNMP (Simple Network Management Protocol), of the so-called 'agent' of each device which stores the device's unique MAC address, the type of device and the MAC addresses embedded in the data passing into a particular port which thereby gives the MAC addresses of the origin of the data and hence the MAC address of the devices which are connected to the ports directly or indirectly.

However, many devices are not SNMP enabled and so the discovery or interrogation of the network produces a result which indicates that these non SNMP enabled devices are displayed as "generic" devices.

There is described a device for use in a network, said device including information identifying the device, which information is made accessible during HTTP (Hyper Text Transfer Protocol) authentication procedure.

13 Claims, 1 Drawing Sheet

(56) References Cited

U.S. PATENT DOCUMENTS

| | | | | |
|---|---|---|---|---|
| 6,664,978 | B1 * | 12/2003 | Kekic et al. | 715/733 |
| 6,704,873 | B1 * | 3/2004 | Underwood | 726/12 |
| 6,732,191 | B1 | 5/2004 | Baker | |
| 6,782,436 | B1 | 8/2004 | Baker | |
| 6,801,920 | B1 | 10/2004 | Wischinski | |
| 6,853,867 | B1 | 2/2005 | Klindt et al. | |
| 6,961,633 | B1 | 11/2005 | Marbach | |

* cited by examiner

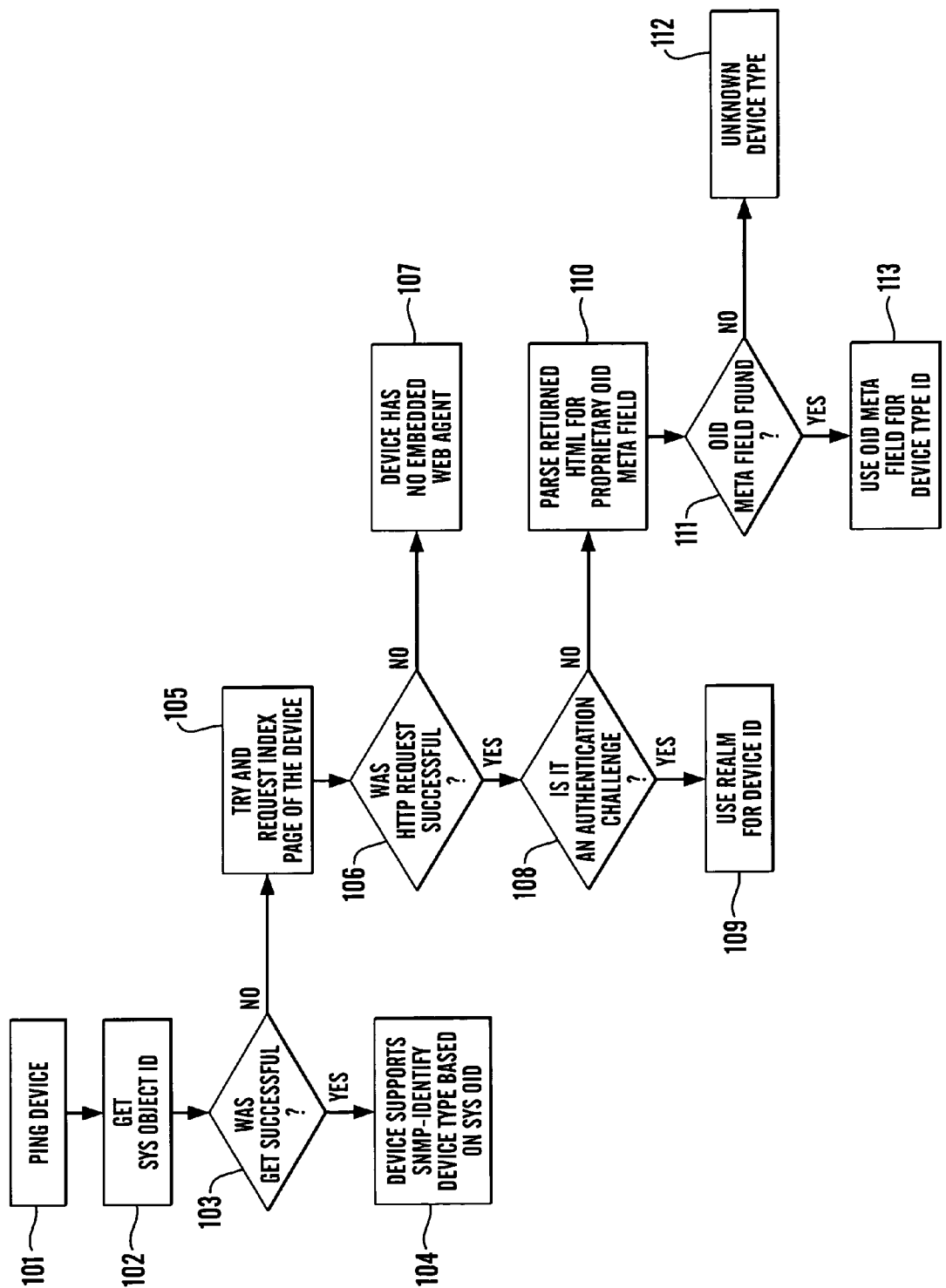

DISCOVERING NON MANAGED DEVICES IN A NETWORK SUCH AS A LAN USING HTTP

BACKGROUND OF THE INVENTION

The present invention relates to a method and apparatus for discovering non managed devices (e.g. devices that do not have an SNMP (Simple Network Management Protocol) agent) in a network such as a LAN (Local Area Network) or other network. The preferred embodiment of the present invention relates to the discovery of devices that do not have an SNMP agent but do include an embedded web agent.

The present invention relates to the process of discovery of the devices on network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), such as an Ethernet network, wide area network (WAN) or other types, including wireless networks.

Computers and other devices connected to a network may be managed or unmanaged devices. A managed device has processing capability, which enables it to monitor data traffic sent from, received at, and passing through the ports of the device. Monitored data associated with the ports of the network device is stored in memory on the network device. For example, data relating to the origin of a data packet which is received at a port is stored along with the identity of the relevant port.

After such a network has been installed, it is desirable for the person appointed network manager to be able to understand the technical operation of the network. In known network management systems, the manner in which the relevant data is retrieved from the managed devices, compiled and displayed "discovered" has been problematic in several respects. Primarily the data does not provide information about unmanaged (eg non SNMP enabled) devices.

The topology of the network may be deduced by the network manager's computer by the process of discovery in which each of the devices of the network is interrogated to thereby produce on a network manager's workstation details of the network and its operation, preferably in the form of a network map which may be displayed on a visual display unit showing the devices and links between the devices. At its simplest, and where the device is a "managed" device, this information is usually provided by interrogation using a known protocol, such as the SNMP (Simple Network Management Protocol), of the so-called 'agent' of each device which stores the device's unique MAC address, the type of device and the MAC addresses embedded in the data passing into a particular port which thereby gives the MAC addresses of the origin of the data and hence the MAC address of the devices which are connected to the ports directly or indirectly.

Many devices are not SNMP enabled and so the discovery or interrogation of the network produces a result which indicates that these non SNMP enabled devices are displayed as "generic" devices.

It would be desirable if one were able to deduce more information about these generic devices, that is non-SNMP enabled devices, and the present invention provides a method of doing so.

SUMMARY OF THE INVENTION

The present invention provides a device for use in a network, said device including information identifying the device, which information is made accessible during HTTP (Hyper Text Transfer Protocol) authentication procedure.

In one arrangement, where the device implements a security mechanism, the device includes means whereby the identifying information is transmitted in response to a challenge request.

In an alternative arrangement, in which the device does not implement a security mechanism, the information identifying the device is added to the head section of an HTML document provided in response to a request by the user.

BRIEF DESCRIPTION OF THE DRAWING

A preferred embodiment of the invention will now be described by way of example only and with reference to the accompanying drawing which is a flow chart of a method of discovery of devices, which method includes steps for discovering HTTP enabled but not SNMP enabled devices on a network, which HTTP enabled devices may or may not include a security mechanism.

DESCRIPTION OF THE PREFERRED EMBODIMENTS

The physical network to be discovered may comprise a plurality of devices in the form of a network supervisor's workstation or computer, other workstations, hubs, or switches.

The devices are connected together by means of links which may be hard wired or wireless and utilise any desired protocol.

The network supervisor's workstation includes, in addition to a visual display unit, a central processing unit or signal processor, a selector which may be in the form of a mouse, a program store which may comprise, for example, a CD drive, a floppy disk drive or a zip drive, and a memory for storing a program which may have been loaded from the program store or downloaded for example via Internet from a website.

To discover the network, using SNMP, the network supervisor's computer interrogates each device and analyse the network, and stores in the memory the information relating to the devices within the network and the links between the devices. In essence, managed devices include a so-called agent which in the case of an SNMP agent stores information about the device such as its unique MAC address, its Sys Object ID (which identifies what the device is and its model type), how many ports it has, and the MAC address of the origin of the data which at least some of the ports have received and hence to which they are directly or indirectly connected. The computer interrogates the agents of each device.

In a preferred arrangement, the computer may, on command from the selector, process signals from the memory by the signal processor and provide on the visual display unit a network map showing each of the devices and the links therebetween. In the examples described, the network is simple but of course in many instances the network will be considerably more complex and it may be necessary to arrange that the visual display unit only shows a simplified version or only part of the network at any one time.

As mentioned above, however, whilst many devices may support (ie communicate using) the SNMP protocol and hence will be discovered and represented by the relevant icon in its correct location on the network map, some devices do not support the SNMP protocol. Examples of such devices are simple switches, network appliances such as firewalls and web caches and indeed work stations. Thus discovering the network using SNMP (or indeed any other related protocol) will mean that these devices will appear as icons representing unmanaged generic devices, in other words, the SNMP protocol will not allow for proper discovery of the identity of these devices. The inventors of this invention have invented an alternative method of identifying these non-SNMP enabled devices and providing relevant details by using a different protocol, ie not SNMP.

Some or all of the devices which are not SNMP enabled will be HTTP enabled.

As is known, a device which is HTTP enabled (which includes many devices including, for example, network device such as a firewall) receives HTTP requests on its TCP port 80. The device may or may not include a security mechanism and we will describe alternative arrangements covering the two cases.

Devices with Security Mechanism
HTTP Authentication Mechanism

Firstly, it will be assumed that the device includes a security mechanism in which the device will only allow access to a client if the client is authorised. Thus the device's files and resources are protected by the standard HTTP authentication mechanism. When a web client (for example, a browser) requests a document or resource from an HTTP enabled device, the device requires the web client to authenticate itself so as to establish that the client is authorised to access the document or resource. The device using HTTP identifies the authentication of realm which applies to the requested resource and also the authentication mechanism.

For example, the web client requests information from the HTTP device by passing a request to the device as follows:
GET /
HTTP/1.0 ... (1)
(i.e. the web client has requested information and has set out the protocol required.)

The device may respond to this where there is security by returning the following message:
HTTP/1.0 401 unauthorised ... (2)
WWW-Authenticate: Basic realm="device" ... (3)

The device will then normally pass to the web client a dialog box requesting a valid user name and password for the requested resource in the named security realm (in this case "device"). The web client then re-requests the resource from the device, using an authorisation field which identifies the authentication mechanism and the encoded or encrypted user response:
GET /
HTTP/1.0
Authorisation: basic YwrTaW46

When the string "YwrTaW46" is decoded by the device using the "Basic" authentication mechanism, it yields the username and password. If valid, the requested resource is then returned to the web client.

In the present arrangement the HTTP authentication mechanism is extended by adding device identification information to the challenge request. When the network supervisor's computer (acting like the "web client" above) interrogates the HTTP enabled device, it makes an HTTP request (line (1) above) for a device resource and receives back the response (lines (2) and (3) above) and in addition device identification information. For example device response is changed as follows:
HTTP/1.0 401 unauthorised (2)
WWW-Authenticate:Basic realm="1.2.3.4.5.6" ... (3A)
(Where the identity of the device is "1.2.3.4.5.6")

The computer can then extract the device identification information by analysing the "realm" field of the authentication challenge. Thus in this new arrangement, the computer simply makes a HTTP request for a device resource and then extracts the device type information by analysing the "realm" field of the authentication challenge.

The device type information can be defined either statically (during the software development for the device) or dynamically upon receipt of a HTTP request by the device.
Device without Security Mechanism In alternative arrangements where device security is not provided the arrangement is as follows. Thus where the device's files and resources are not protected by an HTTP authentication mechanism, the device type information is supplied by embedding this information in the document's <HEAD> section using a HTMP <META> tag.

The <HEAD> section of a HTML document is intended to supply information about the document. Within the <HEAD> section, it is proposed to use the HTML 4.0 standard <META> tag to supply the device type information. The <META> tag is used to declare a document property (eg author, title, keyword) and a value associated with that property. In this arrangement, a document property called "sysObjectID" is defined in the <HEAD> section and the value of the device type is assigned to it.

Typically, Web servers are configured to return a predetermined page if no page has been explicitly requested by the user. This is called the "index" page. The present arrangement embeds the device type information in the <HEAD> section of the index page as follows:
<HTML>
<HEAD>
<META NAME="sysObjectID" CONTENT=" 1.2.3.4.5.6">
- - -
- - -
- - -
</HEAD>
<BODY>
- - -
- - -
- - -
<BODY>
</HTML>

Having deduced the identification information of the device, the network manager's computer is then able to produce a network map on which the device is identified with the relevant information. For example, that information may set out what the device is (work station, printer, etc), what model of device it is (that is the manufacturer and model number), the configuration of the device, the status of the device and such other information as may be useful.

The preferred method of the invention is carried out under the control of the network manager's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source and used to control the processor to carry out the steps of the invention as described.

The program may include an algorithm of the form set out in the flow chart of the drawings.

Thus the program may include the following steps:
program step 101, to cause the network manager's computer to ping a device;
program step 102, to receive sysObjectID from pinged device;
program step 103, was obtaining sysObjectID successful?
if obtaining sysObjectID was successful, (i.e. the device supports SNMP), at program program step 104, identify the device type based on sysObjectID and display device type on network map;
if obtaining sysObjectID was unsuccessful, at program step 105, request index page of the device using HTTP;
at program step 106, was HTTP request successful?
if HTTP request was not successful (device has no embedded web agent) in step 107, display device as generic device on network map;
if HTTP request was successful, at program step 108 was it an authentication challenge?
if yes, at program step 109 use realm for device type identification and display relevant device type on network map;
if no, at program step 110, parse returned HTTP for proprietary OID meta field; program step 111, was OID meta field found?;
if no, program step 112, display generic type device on network map;
if yes, at program step 113, use OID meta field to obtain device type ID and display relevant device on network map.

The invention is not restricted to the details of the foregoing example.

The invention claimed is:

1. A device for use in a network comprising:
an agent running on the device to receive hypertext transfer protocol (HTTP) requests from a computer via the network, wherein the agent is to:
receive an unauthorized HTTP request from the computer; and
send a HTTP challenge request to the computer in response to receipt of the unauthorized HTTP request, wherein the device is to implement a response to the HTTP challenge request from the computer to authorize the computer to access a resource on the device, said HTTP challenge request including a string containing information that identifies the device, and wherein the computer is to extract the information that identifies the device from the string included in the HTTP challenge request to display on a network map the information that identifies the device; and
a processor to implement the agent.

2. The device as in claim 1 wherein the string is a parameter of a REALM field in the challenge request.

3. The device as in claim 1, wherein the agent is further to perform a discovery operation of the computer, wherein the discovery operation comprises transmission of a communication to the computer, and wherein the computer is to send the unauthorized HTTP request response to receipt of the communication.

4. A method for communicating information associated with a device in a network to a computer on the network, said method comprising:
receiving, by the device, a hypertext transfer protocol (HTTP) request from the computer on the network, wherein the HTTP request is an unauthorized HTTP request;
sending, by the device, a HTTP challenge request to the computer in response to receipt of the unauthorized HTTP request, wherein the device is to implement a response to the HTTP challenge request from the computer to authorize the computer to access a resource on the device, said HTTP challenge request including a string that contains information that identifies the device.

5. The method of claim 4 further comprising:
receiving, by the computer, the HTTP challenge request, parsing the HTTP challenge request, and
extracting the information that identifies the device for display in a network map.

6. The method of claim 5 wherein the string is a parameter of a REALM field in the HTTP challenge request.

7. The method of claim 4, further comprising:
performing, by the device, a discovery operation to discover the computer;
receiving, by the computer, a communication pertaining to the discovery operation; and
sending, by the computer, an unauthorized HTTP request to the device in response to receipt of the communication pertaining to the discovery operation.

8. A device for use in a network comprising:
an agent running on the device to receive hypertext transfer protocol (HTTP) requests from a computer via the network, wherein the agent is to:
receive an unauthorized HTTP request for a web page from the computer;
send an HTML encoded document comprising a challenge request to the computer in response to receipt of the unauthorized HTTP request for the web page, said HTML encoded document including a <HEAD> section, wherein the <HEAD> section includes a <META> tag that includes a string containing information that identifies the device, and wherein the computer is to extract the information that identifies the device from the string included in the <HEAD> section of the HTML document for display of the information on a network map; and
a processor to implement the agent.

9. A method for communicating information associated with a device in a network to a computer, said method comprising:
receiving, by the device, a hypertext transfer protocol (HTTP) request from the computer on the network, wherein the HTTP request is for a web page; and
sending, by the device, an HTML encoded document comprising a HTTP challenge request to the computer in response to receipt of the HTTP request for the web page, said HTML encoded document including a <HEAD> section, wherein the <HEAD> section includes a <META> tag that includes a string containing information that identifies the device.

10. The method of claim 9 further comprising:
receiving, by the computer, the HTML encoded document, parsing the <HEAD> section of the HTML document, and
extracting the information that identifies the device for display in a network map.

11. A method of collecting information on devices in a network by a computer, said method comprising:
requesting, by the computer, a sys ObjectID from a device on the network, wherein the sys ObjectID comprises a command under the Simple Network Management Protocol (SNMP);
determining whether the request for the sys ObjectID from the device was unsuccessful;
sending a hypertext transfer protocol (HTTP) request for an index page of the device to the device in response to a determination that the request for the sys ObjectID from the device was unsuccessful;

receiving an HTTP response from the device;

determining whether the response from the device is a HTTP challenge request including a string containing information that identifies the device; and in response to a determination that the response from the device is a HTTP challenge request, extracting the information that identifies the device from the challenge request to identify the device.

12. The method of claim 11, wherein extracting the information that identifies the device from the challenge request further comprises using realm for device type identification and display relevant device type on a network map.

13. The method of claim 12, further comprising:

parsing the received HTTP response from the device for a proprietary object identifier (OID) meta field;

using the OID meta field to obtain a device type ID; and displaying the device on the network map.

\* \* \* \* \*

UNITED STATES PATENT AND TRADEMARK OFFICE
CERTIFICATE OF CORRECTION

| | | |
|---|---|---|
| PATENT NO. | : 9,112,768 B1 | Page 1 of 1 |
| APPLICATION NO. | : 09/662534 | |
| DATED | : August 18, 2015 | |
| INVENTOR(S) | : Brendan Boulter et al. | |

It is certified that error appears in the above-identified patent and that said Letters Patent is hereby corrected as shown below:

In the Claims

In column 5, line 61, in Claim 4, delete "(HTTP" and insert -- (HTTP) --, therefor.

Signed and Sealed this
Sixteenth Day of February, 2016

Michelle K. Lee
*Director of the United States Patent and Trademark Office*